(12) United States Patent
Cheng et al.

(10) Patent No.: US 10,440,217 B2
(45) Date of Patent: Oct. 8, 2019

(54) APPARATUS AND METHOD FOR PROCESSING THREE DIMENSIONAL IMAGE

(71) Applicant: QUANTA COMPUTER INC., Taoyuan (TW)

(72) Inventors: Kai-Ju Cheng, Taoyuan (TW); Yu-Cheng Chien, Taoyuan (TW); Chung Sheng Wu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/963,540

(22) Filed: Apr. 26, 2018

(65) Prior Publication Data
US 2019/0246000 A1    Aug. 8, 2019

(30) Foreign Application Priority Data
Feb. 5, 2018 (TW) .............................. 107104051 A

(51) Int. Cl.
*H04N 13/257* (2018.01)
*H04N 1/193* (2006.01)

(52) U.S. Cl.
CPC ..... *H04N 1/193* (2013.01); *H04N 2201/0081* (2013.01)

(58) Field of Classification Search
None
See application file for complete search history.

(56) References Cited

U.S. PATENT DOCUMENTS

| 2014/0225988 | A1* | 8/2014 | Poropat ................... G01S 17/89 348/46 |
| 2015/0062119 | A1 | 3/2015 | Nakamura et al. |
| 2018/0367786 | A1* | 12/2018 | Furst .................... A61B 5/0073 |

FOREIGN PATENT DOCUMENTS

| JP | 2011205198 A | 10/2011 |
| JP | 2015050482 A | 3/2015 |
| TW | 201721090 A | 6/2017 |
| TW | I613617 B | 2/2018 |

OTHER PUBLICATIONS

Office Action and Search Report dated Feb. 12, 2019 issued by Taiwan Intellectual Property Office for counterpart application No. 107104051.
English Abstract of Foreign Document TWI613617B.
English Abstract of Foreign Document TW201721090A.
(Continued)

*Primary Examiner* — Andrew H Lam
(74) *Attorney, Agent, or Firm* — WPAT, P.C., Intellectual Property Attorneys; Anthony King

(57) ABSTRACT

The present disclosure relates to a three dimensional (3D) scanning apparatus. The 3D scanning apparatus includes an image sensor and a processor. The image sensor has a first sensing area and a second sensing area. The first sensing area is configured to capture a first set of images of an object. The second sensing area is configured to capture a second set of images of the object. The processor is configured to establish a first model based on the first set of images and to establish a second model based on the second set of images. The processor is further configured to compare a correspondence between the first model and the second model.

13 Claims, 7 Drawing Sheets

(56) References Cited

OTHER PUBLICATIONS

Notice of Rejection dated Aug. 1, 2019 issued by Japan Patent Office for counterpart application 2018-110119.
English Abstract Translation of Notice of Rejection issued by Japan Patent Office.
English Abstract Translation of Foreign Reference JP2011205198A.
US Patent Publication 20150062119A1 corresponds to Foreign Patent Document JP2015050482A.

* cited by examiner

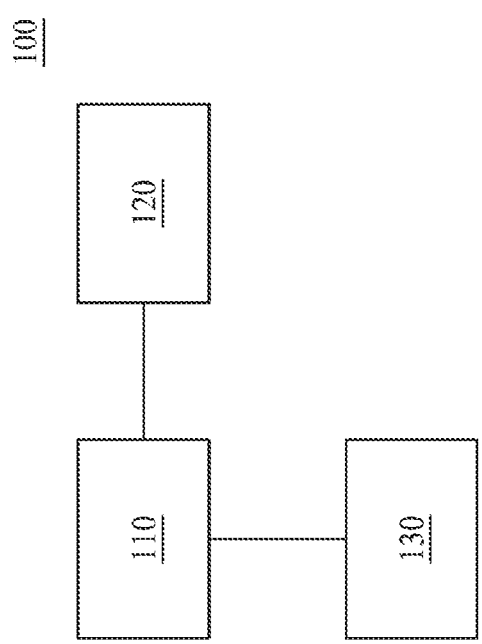

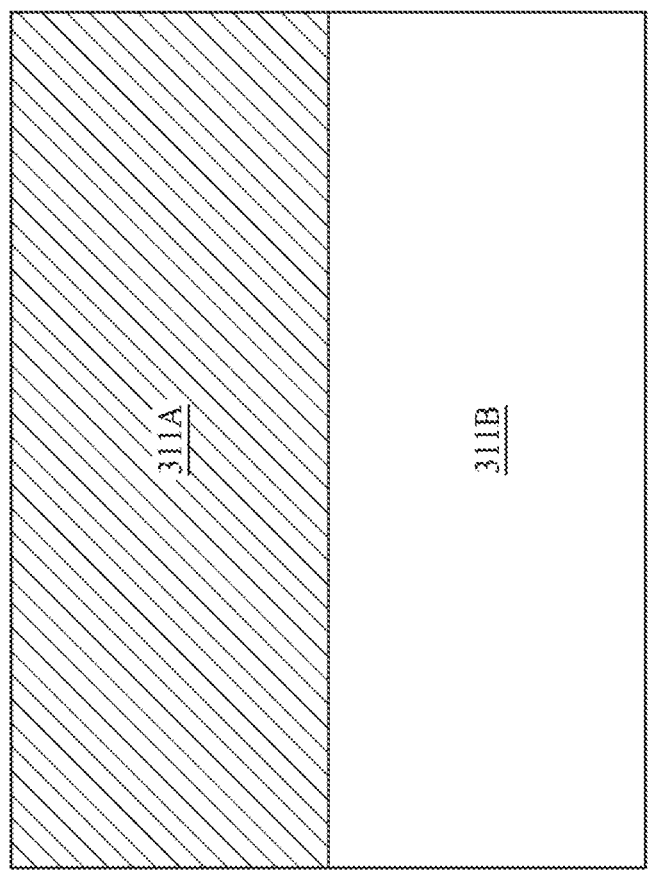

APPARATUS AND METHOD FOR PROCESSING THREE DIMENSIONAL IMAGE

BACKGROUND OF THE INVENTION

1. Field of the Invention

The present disclosure relates to an apparatus and a method for processing three dimensional (3D) images, and more particularly to an apparatus and a method for 3D modeling.

2. Description of the Related Art

A 3D scanning apparatus or a stereoscopic scanning apparatus is to mainly used for scanning a scanned object, to obtain a spatial coordinate and information of a surface of the object (for example, properties such as geometric construction, a color and a surface albedo of an object or an environment). The information obtained by the apparatus is usually used for 3D modeling, to establish a 3D model of the scanned object. The established 3D model can be used for the fields of, for example, medical information, industrial design, robot guidance, geomorphologic measurement, biological information, criminal identification and stereoscopic printing.

In some application fields (for example, tooth model reestablishment), because an object to be scanned is easy to reflect light (for example, saliva is adhered to a tooth), which causes that some areas of the captured image by a sensor of a 3D scanning apparatus are excessively bright, so that information interpretation of the excessively bright areas on the sensor is abnormal, thereby affecting the accuracy of reestablishing a model. Therefore, a 3D scanning apparatus that can accurately scan an object that is easy to reflect light is needed.

SUMMARY OF THE INVENTION

An embodiment of the present disclosure relates to a 3D scanning apparatus. The 3D scanning apparatus includes an image sensor and a processor. The image sensor has a first sensing area and a second sensing area. The first sensing area is configured to capture a first set of images of an object, and the second sensing area is configured to capture a second set of images of the object. The processor is configured to establish a first model based on the first set of images and to establish a second model based on the second set of images. The processor is further configured to compare a correspondence between the first model and the second model.

Another embodiment of the present disclosure relates to a method for 3D modeling. The method includes: (a) capturing a first set of images of an object; (b) capturing a second set of images of the object; (c) establishing a first model based on the first set of images; (d) establishing a second model based on the second set of images; and (e) comparing a correspondence between the first model and the second model.

BRIEF DESCRIPTION OF THE DRAWINGS

The invention will be described according to the appended drawings in which:

FIG. 1 is a schematic block diagram of a 3D scanning apparatus according to some embodiments of the present disclosure;

FIG. 3A, FIG. 3B and FIG. 3C are schematic diagrams of an image sensor according to some embodiments of the present disclosure.

PREFERRED EMBODIMENT OF THE PRESENT INVENTION

Figure 2A:
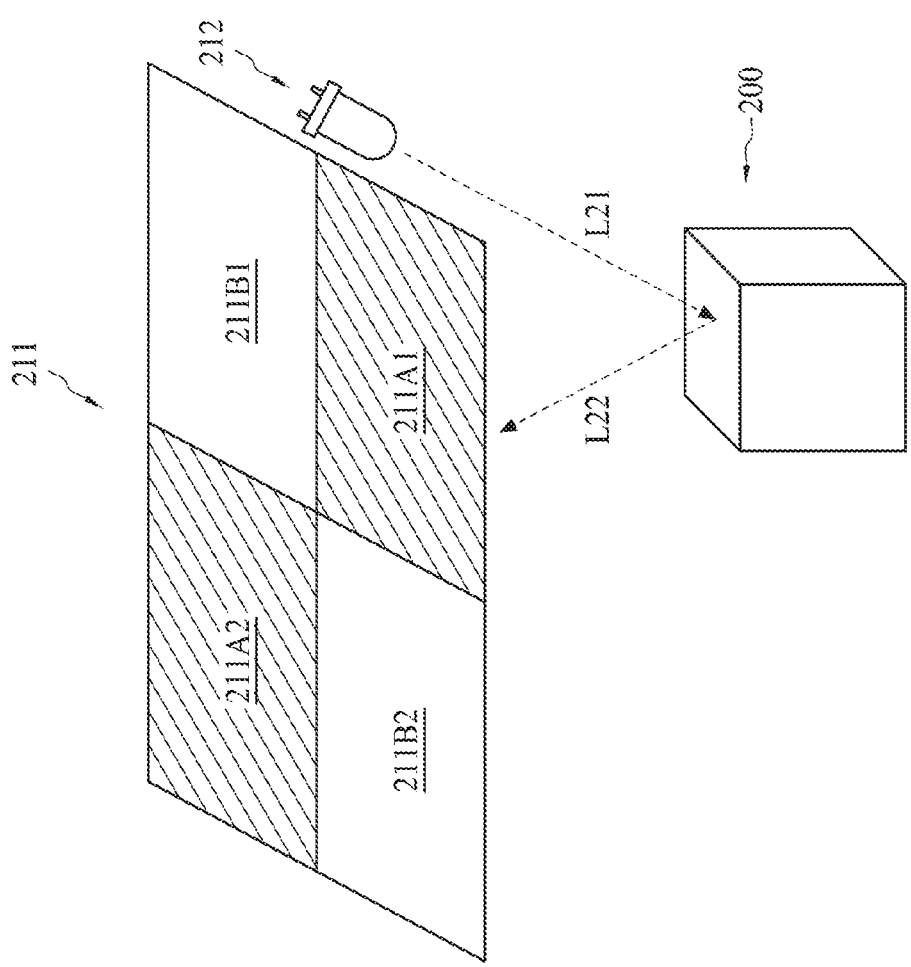
FIG. 2A and FIG. 2B show a method for 3D modeling according to some embodiments of the present disclosure.

FIG. 1 is a schematic block diagram of a 3D scanning apparatus 100 according to some embodiments of the present disclosure. According to the some embodiments of the present disclosure, the 3D scanning apparatus 100 can perform 3D scanning and/or 3D modeling on a stereoscopic object, to establish a digital stereo model associated with the stereoscopic object. According to the some embodiments of the present disclosure, the 3D scanning apparatus 100 can be further coupled to a 3D printing apparatus (not shown), to print a 3D model associated with the established digital stereo model. As shown in FIG. 1, the 3D scanning apparatus 100 includes an image capturing element 110, a controller 120 and a processor 130.

The image capturing element 110 (or an image sensor) is configured to capture 3D image information or feature points of an object to be scanned. According to the some embodiments of the present disclosure, the captured 3D image information or feature points may include, but is not limited to, for example, geometric construction, a color, a surface albedo, a surface roughness, a surface curvature, a surface normal vector or a relative position of the object to be scanned. The image capturing element 110 may include one or more lenses or light source modules. The lens of the image capturing element 110 may be a prime lens, a zoom lens or a combination thereof. The light source module of the image capturing element 110 may be configured to emit a uniform beam, to perform illumination compensation in an environment where a light source insufficient. According to the some embodiments of the present disclosure, the light source module may be a light emitting diode light source or any other suitable light source.

The controller 120 is connected to the image capturing unit 110, and is configured to control the image capturing element 110 to capture 3D image information or feature points of an object to be scanned. In some embodiments, the controller 120 may include one or more types of sensors thereof. The sensor is configured to control the image capturing element 110 to perform image capturing under a predetermined condition. For example, the controller 120 may include an acceleration sensor. The acceleration sensor is configured to control the image capturing element 110 to perform image capturing when detecting that the 3D scanning apparatus 100 moves. For example, the controller 120 may have a location sensor that is configured to control, when the 3D scanning apparatus 100 moves by a predetermined distance, the image capturing element 110 to capture an image. For example, the controller 120 may include a timer. The timer is configured to control the image capturing element 110 to perform image capturing at a predetermined time. In some embodiments, the controller 120 may be integrated into the image capturing unit 110 or the processor 130. In some embodiments, the controller 120 may be omitted, and behaviors of the foregoing controller 120 are replaced by using the processor 130.

The processor 130 is connected to the image capturing element 110, and is configured to receive and process the 3D image information or the feature points of the object to be scanned captured by the image capturing element 110. According to the some embodiments of the present disclosure, the 3D image information or the feature points captured by the image capturing element 110 may be transmitted to the processor 130 by means of wired transmission or wireless transmission (for example, Bluetooth, Wi-Fi, or Near Field Communication (NFC)). The processor 130 may include a memory unit (for example, a random access memory (RAM), or a flash memory). The memory unit is configured to store one or more sets of 3D image information or feature points of the object to be scanned captured by the image capturing element 110. In some embodiments, the memory unit may be an element independent from the processor 130. The processor 130 is configured to superimpose, after receiving a predetermined number of 3D image information or feature points of an object to be scanned, the 3D image information or the feature points, to establish a 3D model of the object to be scanned.

Figure 2B:
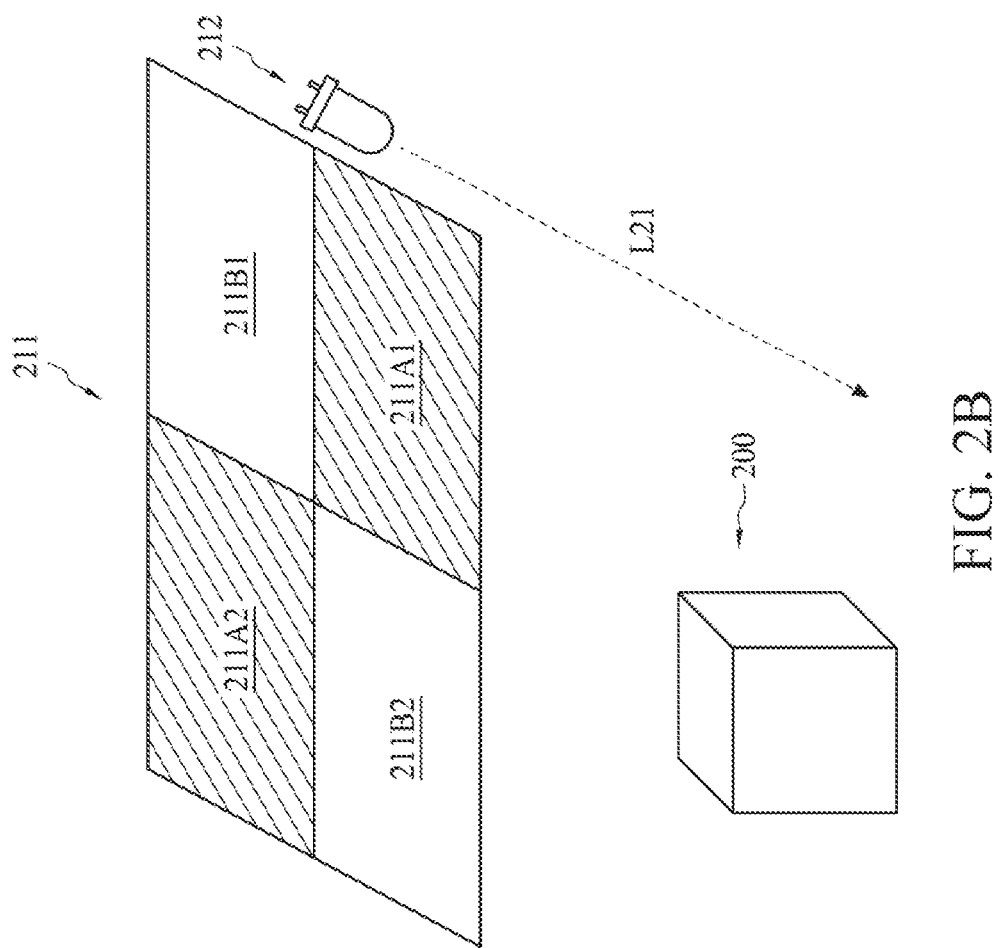

FIG. 2A and FIG. 2B show a method for 3D modeling according to some embodiments of the present disclosure. According to the some embodiments of the present disclosure, the method for 3D modeling of FIG. 2A and FIG. 2B may be performed by using the 3D scanning apparatus 100 of FIG. 1. According to other embodiments of the present disclosure, the method for 3D modeling of FIG. 2A and FIG. 2B may be performed by using other 3D scanning apparatuses.

FIG. 2A discloses an object 200 to be scanned and some elements of a 3D scanning apparatus (including an image sensor 211 and a light source module 212). According to the some embodiments of the present disclosure, the image sensor 211 and the light source module 212 may be included in the image capturing element 110 as shown in FIG. 1. According to the other embodiments of the present disclosure, the light source module 212 may be independent from the image capturing element 110 as shown in FIG. 1.

The light source module 212 is configured to emit a beam L21 to illuminate the object 200 to be scanned. According to the some embodiments of the present disclosure, the light source module 212 may a light emitting diode light source or any other suitable light source.

According to the some embodiments of the present disclosure, the object 200 to be scanned has a surface that is easy to reflect light. For example, the object 200 to be scanned may be a tooth. Saliva is adhered to the tooth. Therefore, light reflection is easy to be caused. For example, the object 200 to be scanned may be metal. Light reflection is easy to be caused on a surface of the object 200 to be scanned. In this way, after the surface that is easy to reflect light reflects, an error of capturing information is to be generated in the sensor 211, thereby causing 3D modeling of reestablishment distortion and contortion.

Figure 3B:
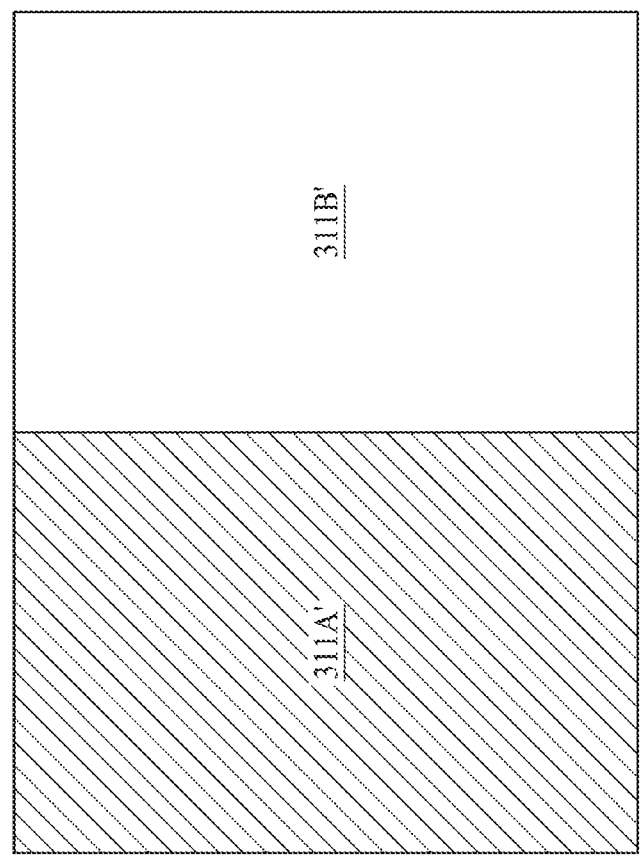
Figure 3C:
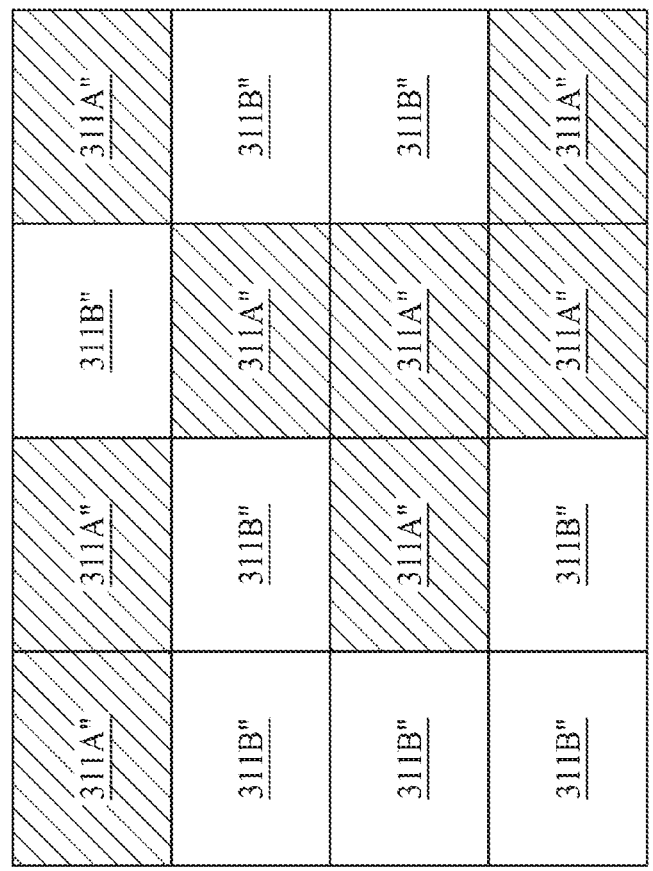

The image sensor 211 is configured to divide a sensing area into two areas 211A (a first area) and 211B (a second area). According to the some embodiments of the present disclosure, besides the two areas 211A and 211B defined as FIG. 2A, two areas "311A and 311B", "311A' and 311B'" and "311A" and 311B"" may also be defined as FIG. 3A, FIG. 3B and FIG. 3C.

In a specific embodiment, an area ratio of the first sensing area 211A to the second sensing area 211B is 1:1.

According to the some embodiments of the present disclosure, the areas 211A and 211B of the image sensor 211 may be defined by using the processor 130 of the 3D scanning apparatus. In addition, according to different design request, the processor 130 may be configured to arbitrarily define two areas of the image sensor 211. In addition, each area is not limited to include only a single continuous area. Using FIG. 2A as an example, the first area 211A further includes a first sub-area 211A1 of the first area and a second sub-area 211A2 of the first area. Correspondingly, the second area 211B also includes a first sub-area 211B1 of the second area and a second sub-area of the second area 211B2.

After dividing the sensing area into two sets of areas 211A and 211B, the image sensor 211 is configured to capture a first set of images (or a first set of image information (or features)) of the first area 211A of the object 200 to be scanned and a first set of images of the second area 211B of the object 200 to be scanned. Using FIG. 2A as an example, at a time point t1, the first set of images of the first area 211A includes images of the first sub-area 211A1 of the first area and the second sub-area 211A2 of the first area; and the first set of images of the second area 211B includes images of the first sub-area 211B1 of the second area and the second sub-area 211B2 of the second area.

According to the some embodiments of the present disclosure, a first set of image information of each area includes geometric construction, a color, a surface albedo, a surface roughness, a surface curvature, a surface normal vector, a relative position and so on.

The 3D scanning apparatus 100 then moves to right in the figure, and uses the image sensor 211 to capture a second set of images (or a second set of image information (or features)) of the first area 211A of the object 200 to be scanned and a second set of images of the second area 211B of the object 200 to be scanned. Using FIG. 2B as an example, similarly, at a time point t2, the second set of images of the first area 211A includes images of the first sub-area 211A1 of the first area and the second sub-area 211A2 of the first area; and the second set of images of the second area 211B includes images of the first sub-area 211B1 of the second area and the second sub-area 211B2 of the second area.

According to the some embodiments of the present disclosure, a second set of image information of each area includes geometric construction, a color, a surface albedo, a surface roughness, a surface curvature, a surface normal vector, a relative position and so on.

Subsequently, the 3D scanning apparatus 100 superimposes the first set of images on the second set of images that are respectively captured by using the first area 211A of the image sensor 211 at the time points t1 and t2. Similarly, the 3D scanning apparatus 100 superimposes the first set of images on the second set of images that are respectively captured by using the second area 211B of the image sensor 211 at the time points t1 and t2.

According to the some embodiments of the present disclosure, the 3D scanning apparatus 100 is configured to determine, when superimposing the first set of images on the second set of images, whether common image information or feature points of all or some images of the first set of images and the second set of images that are captured by the first area 211A are sufficient to perform superimposing. Similarly, the 3D scanning apparatus 100 is configured to determine whether common image information or feature points of all or some images of the first set of images and the second set of images that are captured by the second area 211B are sufficient to perform superimposing.

Subsequently, the 3D scanning apparatus 100 is configured to determine whether capturing images has ended. When capturing images is determined to have not ended, next set of images continues to be captured, and is superimposed again. For example, when capturing images is determined to have not ended, the 3D scanning apparatus 100 captures a third set of images, and superimposes the third set of images on the second set of images.

In a specific embodiment, the 3D scanning apparatus 100 detects that a user triggers a button, and capturing images is determined to have ended. In a specific embodiment, when the 3D scanning apparatus 100 does not move exceeds a predetermined time or the 3D scanning apparatus 100 does not capture images exceeds a predetermined time (for example, exceeding 10 seconds or exceeding 30 second), capturing images is determined to have ended.

When capturing images is determined to have ended, the 3D scanning apparatus 100 is configured to enable all of the foregoing superimposed images to respectively obtain a first model and a second model of the object 200 to be scanned according to different areas. For example, the first area 211A is corresponding to the first model, and the second area 211B is corresponding to the second model.

According to the some embodiments of the present disclosure, the 3D scanning apparatus is configured to compare a correspondence between the first model and the second model. For example, the 3D scanning apparatus may determine the correspondence between the first model and the second model by calculating a peak signal-to-noise ratio (PSNR) of depth images corresponding to the first model and the second model. According to the some embodiments of the present disclosure, the PSNR of the depth images corresponding to the first model and the second model may be obtained by using Equation (1) and Equation (2), where I and P respectively represent m×n depth images of the first model and the second model, and MAXI represents a maximum value of the depth images (for example, if each sampling point is represented by eight bits, MAXI is 255):

$$MSE = \frac{1}{mn}\sum_{i=0}^{m-1}\sum_{j=0}^{n-1} \|I(i, j) - P(i, j)\|^2 \qquad \text{Equation (1)}$$

$$PSNR = 10\log_{10}\left(\frac{MAXI^2}{MSE}\right) \qquad \text{Equation (2)}$$

When the PSNR of the depth images corresponding to the first model and the second model calculated by using the 3D scanning apparatus is greater than a predetermined value (for example, 30 dB), the 3D scanning apparatus determines that reliability of 3D modeling this time is relatively high and 3D modeling is relatively accurate. If the PSNR of the depth images corresponding to the first model and the second model calculated by using the 3D scanning apparatus is less than the predetermined value, the 3D scanning apparatus determines that reliability of 3D modeling this time is relatively low and rescanning is needed.

Figure 4:
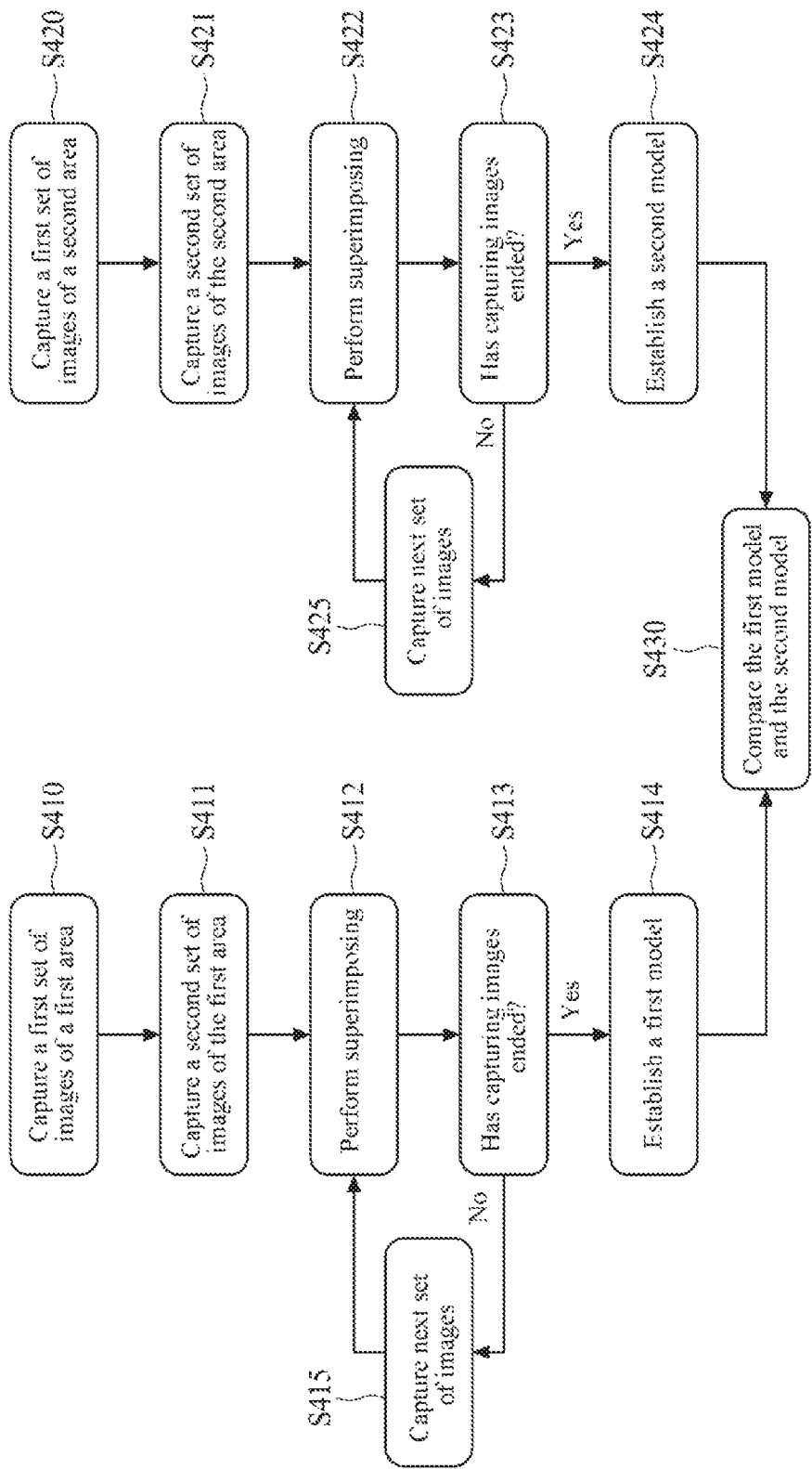
FIG. 4 is a flow chart of a method for 3D modeling according to some embodiments of the present disclosure.

FIG. 4 is a flow chart of 3D modeling according to some embodiments of the present disclosure. According to the some embodiments of the present disclosure, FIG. 4 is a flow chart of a method for 3D modeling disclosed as FIG. 2A and FIG. 2B. Because steps performed in the first area 211A and steps performed in the second area 211B are synchronously the same, the following lists only steps performed in the first area 211A.

Referring to step S410 (step S420), a first set of images of a first area of an object to be scanned is captured. According to the some embodiments of the present disclosure, the first set of images of the object 200 to be scanned may be captured as the first area 211A of the image sensor 211 of FIG. 2A. The first set of images of the first area 211A may include images of the first sub-area 211A1 of the first area and the second sub-area 211A2 of the first area.

Referring to step S411 (step S421), a second set of images of the first area of the object to be scanned is captured. According to the some embodiments of the present disclosure, the second set of images of the object 200 to be scanned may be captured as the first area 211A of the image sensor 211 of FIG. 2A. The second set of images of the first area 211A may include images of the first sub-area 211A 1 of the first area and the second sub-area 211A2 of the first area.

Referring to step S412 (step S422), a 3D scanning apparatus is configured to superimpose the first set of images on the second set of images that are captured by using the first area 211A of the image sensor 211.

Referring to step S413 (step S423), the 3D scanning apparatus 100 is configured to determine whether capturing images has ended.

When capturing images is determined to have not ended, proceed to step S415 (step S425), the 3D scanning apparatus 100 is configured to capture a third set of images. Subsequently, return to the step S412 (the step S422) to superimpose the third set of images on the second set of images.

When capturing images is determined to have ended, proceed to step S414 (step S424), the 3D scanning apparatus 100 is configured to enable all of the foregoing superimposed images to obtain a first model of the object 200 to be scanned. Similarly, the 3D scanning apparatus 100 is configured to superimpose all of the captured images corresponding to the second area 211B to obtain a second model of the object 200 to be scanned.

Referring to step S430, after the first model and the second model are established (that is, the step S414 and the step S424 are completed), a correspondence between the first model and the second model is compared. For example, the 3D scanning apparatus may determine the correspondence between the first model and the second model by calculating a PSNR of depth images corresponding to the first model and the second model. When the PSNR of the depth images corresponding to the first model and the second model calculated by using the 3D scanning apparatus is greater than a predetermined value (for example, 30 dB), the 3D scanning apparatus determines that reliability of 3D modeling this time is relatively high and 3D modeling is relatively accurate. If the PSNR of the depth images corresponding to the first model and the second model calculated by using the 3D scanning apparatus is less than the predetermined value, the 3D scanning apparatus determines that reliability of 3D modeling this time is relatively low and returning to the steps S410 to S414 and the steps S420 to S424 is needed.

The embodiments of FIG. 1 to FIG. 4 of the present disclosure may be used for 3D reestablishment (or 3D modeling) of an object that is easy to reflect light. For example, the embodiments may be used for reestablishment of a tooth model to which saliva is easy to be adhered, 3D reestablishment of an object having a metal surface or 3D reestablishment of any other object that is easy to reflect light. Conventional 3D scanning apparatus cannot detect an error of capturing information caused by light reflected by an object to be scanned. Therefore, a model reestablished by the 3D scanning apparatus is found to have an error or distortion with an object to be scanned only after being printed. In this way, time and costs of 3D modeling are wasted. According to the embodiments of FIG. 1 to FIG. 4 of the present disclosure, the sensing area of the image capturing element or the image sensor is divided into an area that receives light reflected by an object to be scanned and an area that does not receive light reflected by an object to be scanned, and the correspondence between the models reestablished by using the two sensing areas is compared by using the processor of the 3D scanning apparatus. Therefore, time and costs of 3D modeling can be greatly reduced.

Although the technical contents and features of the present invention are described above, various variations and modifications can be made by persons of ordinary skill in the art without departing from the teaching and disclosure of the present invention. Therefore, the scope of the present invention is not limited to the disclosed embodiments, but encompasses other variations and modifications that do not depart from the present invention as defined by the appended claims.

The above-described embodiments of the present invention are intended to be illustrative only. Numerous alternative embodiments may be devised by persons skilled in the art without departing from the scope of the following claims.

What is claimed is:

1. A three dimensional (3D) scanning apparatus, comprising:
    an image sensor, having a first sensing area and a second sensing area, the first sensing area being configured to capture a first set of images of an object, and the second sensing area being configured to capture a second set of images of the object; and
    a processor, configured to establish a first model based on the first set of images and to establish a second model based on the second set of images, and further configured to compare a correspondence between the first model and the second model;
    wherein the processor is further configured to calculate a peak signal-to-noise ratio (PSNR) of depth images corresponding to the first model and the second model.

2. The 3D scanning apparatus according to claim 1, wherein the processor is further configured to determine whether the PSNR is greater than a predetermined value.

3. The 3D scanning apparatus according to claim 1, further comprising a light source module configured to emit a beam to the object.

4. The 3D scanning apparatus according to claim 1, wherein an area ratio of the first sensing area to the second sensing area is 1:1.

5. The 3D scanning apparatus according to claim 1, wherein the processor is further configured to capture image information of the first set of images and image information of the second set of images.

6. The 3D scanning apparatus according to claim 5, wherein the image information of the first set of images or the image information of the second set of images comprises at least one of the following of the object or a combination thereof: geometric construction, a color, a surface albedo, a surface roughness, a surface curvature, a surface normal vector or a relative position.

7. A method for 3D modeling, the method comprising:
    (a) capturing a first set of images of an object;
    (b) capturing a second set of images of the object;
    (c) establishing a first model based on the first set of images;
    (d) establishing a second model based on the second set of images; and
    (e) comparing a correspondence between the first model and the second model;
    wherein the step (e) further comprises calculating a PSNR of depth images corresponding to the first model and the second model.

8. The method according to claim 7, wherein the first set of images and the second set of images are respectively captured by using a first sensing area and a second sensing area of an image sensor.

9. The method according to claim 8, further comprising emitting a beam to illuminate the object.

10. The method according to claim 8, wherein an area ratio of the first sensing area to the second sensing area is 1:1.

11. The method according to claim 10, further comprising capturing image information of the first set of images and image information of the second set of images.

12. The method according to claim 11, wherein the image information of the first set of images or the image information of the second set of images comprises at least one of the following of the object or a combination thereof: geometric construction, a color, a surface albedo, a surface roughness, a surface curvature, a surface normal vector or a relative position.

13. The method according to claim 7, further comprising determining whether the PSNR is greater than a predetermined value.

* * * * *